United States Patent [19]

Brancaleone et al.

[11] 3,790,858

[45] Feb. 5, 1974

[54] ELECTRICAL CONNECTOR WITH COMPONENT GROUNDING PLATE

[75] Inventors: Salvatore T. Brancaleone, Scottsdale; Leland W. Oliver, Tempe, both of Ariz.

[73] Assignee: International Telephone and Telegraph Corporation, New York, N.Y.

[22] Filed: Jan. 29, 1973

[21] Appl. No.: 327,682

[52] U.S. Cl. .............. 317/99, 317/101 CC, 174/51, 339/14 R, 339/193 P

[51] Int. Cl. .............................................. H05k 7/04

[58] Field of Search ......... 174/DIG. 5, 51; 338/220; 339/14 R, 14 L, 17 R, 17 C, 18 R, 18 B, 18 P, 147 R, 193 P; 317/99, 101 R, 101 CB, 101 CC, 101 D, 118, 120

[56] References Cited

UNITED STATES PATENTS

| | | | |
|---|---|---|---|
| 3,569,915 | 3/1971 | Sorensen | 339/147 R |
| 3,382,475 | 5/1968 | Kramer | 339/18 P |
| 3,597,659 | 8/1971 | Hoffman | 317/101 P |

*Primary Examiner*—Herman J. Hohauser
*Assistant Examiner*—Gerald P. Tolin
*Attorney, Agent, or Firm*—Thomas L. Peterson

[57] ABSTRACT

An electrical connector in which circuit components are integrated into the connector by mounting the same within the grounding plate in the shell of the connector. Conductors of the circuit components are connected to selected electrical contact elements in the connector preferably by means of a printed circuit board which is removably mounted in the shell of the connector. Examples of circuit components which may be integrated into the connector are electromagnetic pulse absorbers and radio frequency filter elements.

14 Claims, 3 Drawing Figures

ELECTRICAL CONNECTOR WITH COMPONENT GROUNDING PLATE

BACKGROUND OF THE INVENTION

This invention relates generally to an electrical connector and, more particularly, to a connector in which circuit components which are normally part of an external circuit are integrated into the connector shell.

The integration of circuit components into electrical connectors has been in practice for some time. The obvious limitation in integrating circuit components in connectors is the component size. One common technique used to integrate circuit components in a connector is to group and wire the components at the rear end of the connector. This usually results in a connector which is enlarged in both diameter and length. As may be expected, the larger circuit components usually provide the performance which is impossible to obtain in those circuit components which are normally integrated into connectors. In addition, when circuit components are mounted externally of a connector by use of wires or a printed circuit board, substantial lead inductance problems occur. Thus, what is needed is a convenient means for mounting circuit components integrally within an electrical connector so that the resulting assembly is relatively small in size, simple in construction, and less in weight than conventional connectors in which circuit components are integrated. In addition, it is desirable that the aforementioned lead inductance problem be minimized.

SUMMARY OF THE INVENTION

The principal object of the present invention is to provide an improved electrical connector in which circuit components are integrated therein.

According to the principal aspect of the present invention, there is provided an electrical connector comprising a shell containing a grounding plate and electrical contact elements passing through the plate which are adapted to engage electrical contact elements in a second electrical connector member which is interengageable with first mentioned connector. A circuit component is mounted in the shell in electrical contact with the grounding plate and a printed circuit board which is removably mounted in the shell provides electrical connection between one of the conductors of the circuit component and selected electrical contact elements in the connector. By this arrangement, an electrical connector having circuit components integrated therein is provided which is smaller in size, less in weight, and more simple in construction than similar connectors heretobefore known. Moreover, since the printed circuit board is mounted within the shell of the connector, lead inductance problems are minimized. Still further, the connector provides RFI shielding surrounding each contact and electrical circuit component in the connector.

DESCRIPTION OF THE PREFERRED EMBODIMENTS

Figure 1:
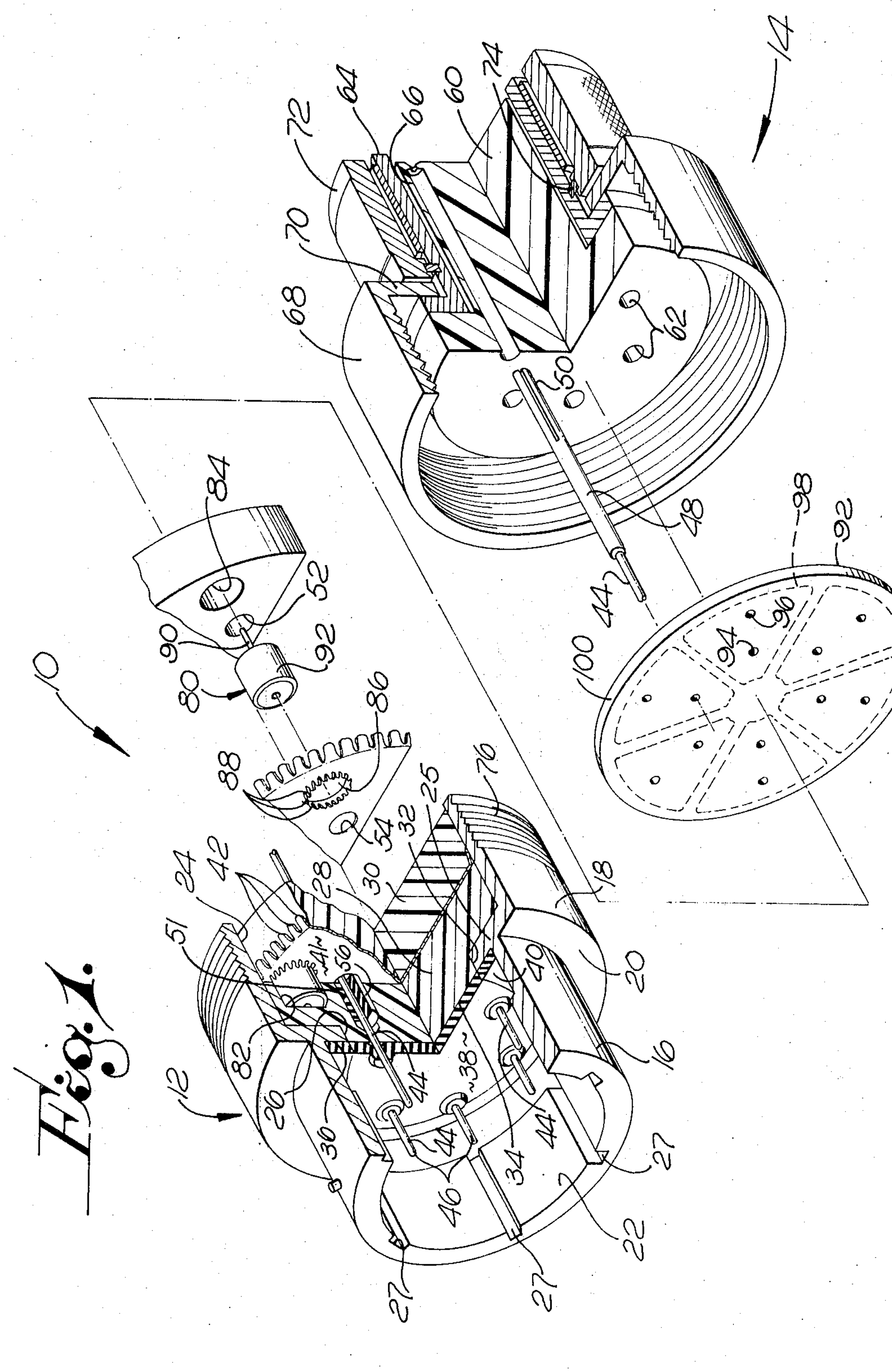
FIG. 1 is an exploded perspective view of one form of the present invention, with portions of the shell of the connector broken away to show the construction and details of the grounding plate, the electrical contact elements and circuit components mounted within the assembly.

Referring now to the drawings, wherein like reference characters designate like or corresponding parts throughout the various views, there is shown in FIG. 1 the preferred embodiment of the electrical connector assembly of the invention, generally designated 10. The connector 10 is in the form of an adaptor which is designed to be interconnected between standard mating plug and receptacle connector members, not shown. The connector 10 includes basically two parts, a receptacle shell 12 and plug barrel assembly 14.

The shell 12 includes a front cylindrical section 16 and a rear enlarged diameter section 18 joined by an annular ring section 20. A bore 22 is formed in the forward portion 16 of shell 12 while a bore 24 coaxial with bore 22 is formed in the rear section 18 of the shell. A flange 25 extends radially inwardly from the ring section 20 of the shell defining a circular passageway 26 interconnecting the bores 22 and 24 in the shell. Polarizing axially extending keyways 27 formed about the interior of the forward section 16 of the shell are adapted to receive polarizing keys, not shown, on a mating connector member. Front and rear insulators 28 and 30, respectively, are positioned in the bore 24 of the shell 12. A forwardly-extending reduced diameter section 32 of the insulator 28 extends into the passageway 26 in the shell. The forward face 34 of such forwardly-extending portion 32 terminates in a plane coplaner with the forward face 36 of the flange 25. An interfacial sealing member 38 covers the forward face 34 of the insulator 28 and a peripheral sealing member 40 in a form of an annular ring surrounds the interfacial sealing member 38 and abuts against the forward face 36 of flange 25.

A grounding plate 41, often referred to in the art as a ground plane, is sandwiched between the forward and rear insulators 28 and 30, respectively. The grounding plate is in the form of a thin metallic disc embodying a plurality of peripheral springfingers 42 which frictionally engage the inner surface of the rear section 18 of shell 12.

A plurality of electrical contact elements 44 are mounted in the shell 12, six of such elements being provided in the connector 10 illustrated in FIG. 1. However, it will be understood that any number of connector elements may be provided depending upon the application to which the connector will be put to use. Moreover, the contact elements 44 may be may be positioned in any pattern as desired, the preferred pattern, however, being a circular array coaxial with longitudinal axis of the shell, as shown. Each contact element 44 includes a forward pin end 46 which extends beyond the forward face of the interfacial sealing member 38. Each contact element further includes a rear socket end 48 which terminates in a plurality of spring fingers 50 which are adapted to receive a contact pin from a mating connector member, not shown. The contact elements are mounted in aligned passages formed in the interfacial sealing member 38, front insulator 28, grounding plate 41, and rear insulator 30. Enlarged aligned bores 51 and 52 in the front and rear insulators 28 and 30, respectively, and bore 54 in the grounding plate 41 define cylindrical cavities for housing cylindrical insulators 56 which surrounds the contact elements 44 and electrically isolate the same from the grounding plate. Alternatively, the members 56 may consitute RFI filter elements each having an external conductive surface engaging the grounding plate 41. The structure of such filter elements is well known in the art, and the details thereof will not be described herein. However, reference may be had to U. S. Pat. Nos. 3,462,715; 3,588,758; and 3,497,711 for examples of suitable filter elements. The members 56 may also comprise ferrite cylinders which function as RF filters.

The plug barrel assembly 14 includes a socket insulator 60 having six longitudinally extending passages 62 extending therethrough in alignment with the contact elements 44 and adapted to receive the socket ends 48 of these elements. A barrel 64 surrounds a rear reduced diameter portion 66 of the socket insulator. A coupling ring 68 is rotatably mounted on the barrel 64. The ring is formed with a radially-inwardly extending flange 70 which is restrained from axially displacement by means of a coupling nut 72 which is retained on barrel 64 via a retainer ring 74. The coupling ring 68 is internally threaded at its forward end for threaded engagement on the receptacle shell 12 which is threaded at its rear end at 76.

The construction of the connector 10 described so far is generally conventional and is given by way of example only, it being understood that the features of the present invention can be applied to any form of connector employing a grounding plate.

In accordance with an important feature of the present invention, a plurality of electric circuit components, indicated by reference numeral 80, are mounted within the connector 10. Such components may comprise any electrical circuit components which would normally be part of an external circuit. Each component embodies a central pen and conductive outer casing which requires grounding. An example of such a circuit component is an electro-magnetic pulse absorber. Such a device comprises a switching diode with high current capability for short durations intended to provide a controlled path for unwanted extremely high energy spurious pulses.

Devices of this nature are marketed under trade name Transorb by General Semiconductor Company.

An RF filter which is too large for the usual coaxial electrical connection to the contact elements 44 might also constitute the electrical component 80. Any number of components 80 may be mounted within the connector 10, depending upon their size and configuration. Six such components are provided in the connector illustrated in FIG. 1.

The components 80 are arranged in a generally circular path which surrounds the circular array of contact elements 44. Preferably, each component 80 lies in the same radial path as does the corresponding contact element 44. Recesses 82 and 84 are formed in the front and rear insulators 28 and 30, respectively, for receiving the components 80. A plurality of apertures 86 are formed in the grounding plate 41 in alignment with the recesses 82 and 84. These apertures are bordered by tangs 88 formed in the grounding plate 41 which serve to electrically and frictionally engage the circuit components 80. Each component 80 includes an inner conductor 90 and outer conductor 92, the latter being in electrical contact with shell 12 by means of the grounding plate. The inner conductor 90 extends beyond the rear of the rear insulator 30.

In order to provide the desired electrical connection between the circuit components 80 and contact elements 44, there is provided a circular printed circuit board 92 which has an inner diameter slightly less than the diameter of the bore 24 in the shell 12. The board 92 is positioned immediately behind the rear insulator 30 in the shell. The board is formed with a plurality of contact openings 94 and 96, respectively. The openings 94 are in alignment with the contact elements 44 while the openings 96 are in alignment with the inner conductors 90 of the circuit components 80. Radially extending conductive strips 98 on the rear face 100 of the board 92 provide electrical paths between the six pairs of contact openings 94 and 96. When the board 92 is appropriately positioned in the shell 12, the contact elements 44 will pass through and electrically engage the inner contact openings 94 in the board and the inner conductors 90 of the circuit components 80 will pass through and electrically engage the outer contact openings 96 in the board. A soldered junction is made at the point where each of these conductors passes through an opening in the printed circuit board. Thus, electrical contact is provided by the printed circuit board between each contact element 44 and an adjacent circuit component 80. In addition, a path is provided to ground for the circuit components 80 and contact elements 44 via the peripheral fingers 42 on the grounding plate 41. If the element 56 surrounding each contact element is an RF filter or ferrite bead rather than an insulator, as shown, the present invention will provide RFI protection as well as the advantages afforded by the characteristics of the circuit components 80.

Thus, it will be appreciated that by the embodiment of the invention illustrated in FIG. 1 of the drawing, there is provided a connector adaptor which may be connected between the plug and receptacle members of a standard connector assembly, and the adaptor will integrally incorporate therein desired circuit components which heretofore have been normally mounted outside of the connector shell. By the arrangement of the circuit components in the connector 10 and the use of a printed circuit board therein, a connector is provided of relatively small size, light weight, and simplicity in construction. In addition, because the printed circuit board is positioned inside the shell 12 of the connector, lead inductance problems are minimized. If lead inductance is not of concern, interconnection of the circuit components and the contacts may be made by methods other than a printed circuit board.

Figure 2:
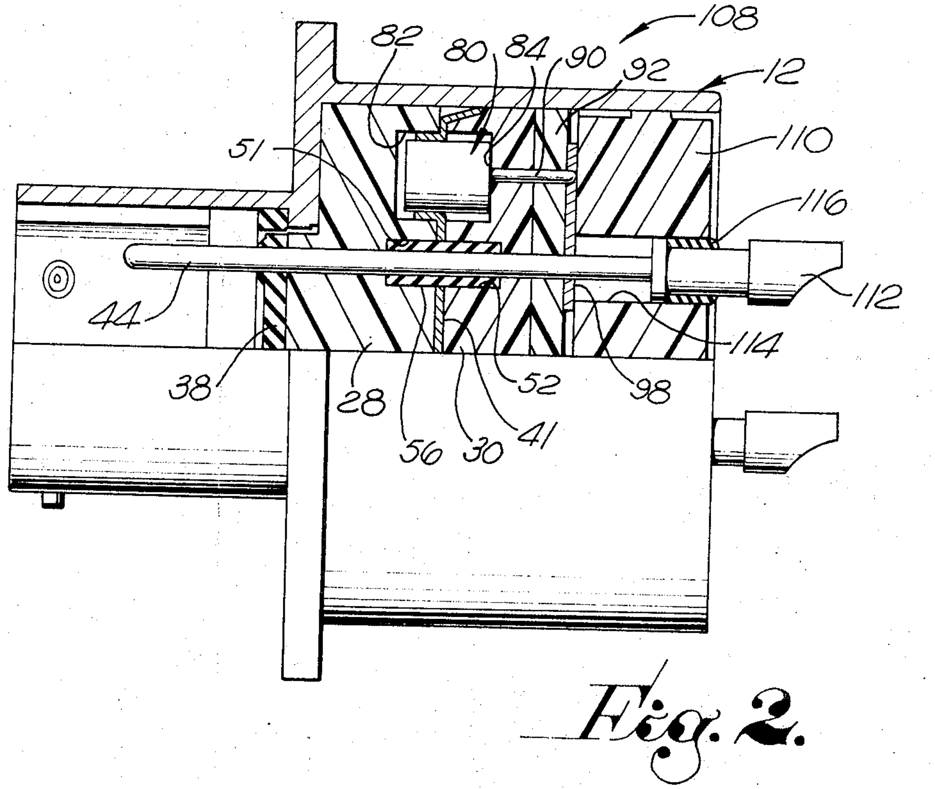
FIG. 2 is a longitudinal partial sectional view through a modified form of the connector illustrated in FIG. 1 in which solder pots are incorporated in one end of the connector.

Reference is now made to FIG. 2 of the drawing which illustrates a second embodiment 108 of the invention which is essentially identical to the connector 10 illustrated in FIG. 1 except for one terminal end of the connector. The connector 108 differs from connector 10 in the elimination of the plug barrel assembly 14 and the substitution therefor of an insulator 110 which is mounted in the rear of the shell 12A behind the printed circuit board 92 and thus closes the rear end of the shell. The rear ends of the contact elements 44 terminate in solder pots 112 to which wires may be soldered. The rear portion of the contact elements 44 and the solder pots 112 extend through longitudinally extending passages 114 formed in the insulator 110. A suitable potting material 116 seals the solder pots in the insulator. Thus, the connector 108 is adapted at one end for permanent connection to wires through the solder pots 112 and at the opposite end for interengagement with a mating connector assembly, not shown. Alternatively, the rear end of the contacts 44 may be constructed for connection with other contacts, not shown, that are rear insertable and removable from the contacts 44.

Figure 3:
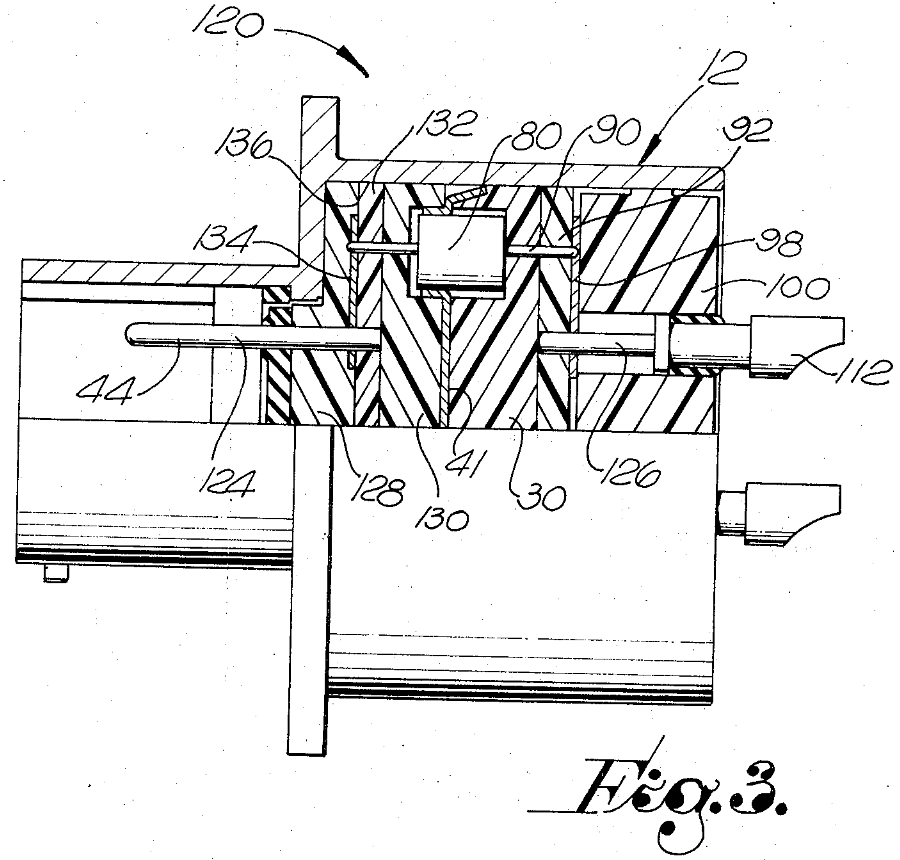
FIG. 3 is a partial longitudinal sectional view of an additional embodiment of the invention in which circuit components are connected in series to the electrical contact elements in the connector.

FIG. 3 of the drawings shows a further embodiment of the invention designated 120. The connector 120 differs from the connectors illustrated in FIGS. 1 and 2 in that each contact element 44 is comprised of two separate parts, a front part 124 and a rear part 126 which are in longitudinal alignment but axially spaced from one another. The front insulator in the shell is divided into axially spaced first and second sections 128 and 130 which have interposed therebetween a printed circuit board 132. This board is essentially identical to the printed circuit board 92 positioned between the rear insulator 30 and the insulator 110. As seen in FIG. 3, the forward part 124 of the contact element 44 is electrically connected to a forwardly extending portion of the center conductor 90 of circuit component 80 by conductive strip 134 on the forward face 136 of the board 132. The rear portion of the conductor 90 of the circuit component 80 is electrically connected to the rear part 126 of the contact element 44 by the conductive strip 98 on the rear circuit board 92. Thus, by this arrangement the circuit components 80 are connected in series, rather than in parallel, with the contact elements of the connector. As in the embodiments illustrated in FIGS. 1 and 2, the circuit component case is grounded to the shell through the ground plate 41. This is useful in a circuit network having both series and parallel connected elements.

Although several embodiments of the invention have been disclosed herein for purposes of illustration, it will be understood that various changes can be made in the form, details, arrangements and proportions of the various parts in such embodiments without departing from the spirit and scope of the invention as defined by the appended claims. For example, selected contact elements 44 within the connector could be eliminated and the circuit components 80 substituted therefor, or vice versa. Moreover, certain contact elements could pass through nonconductive openings in the circuit board 92 or selected contact elements could be joined by conductive strips on the circuit board.

What is claimed is:

1. An electrical connector comprising:

an electrical connector shell;

a grounding plate in said shell in electrical contact therewith;

a plurality of apertures in said plate;

a plurality of electrical contact elements and other electrical components positioned in said shell;

said other components each including a central conductor and outer conductive surface surrounding and spaced from said central conductor, said components being mounted in selected apertures in said grounding plate;

said outer conductive surfaces being in electrical contact with said grounding plate; and means within said shell electrically connecting said central conductors to selected ones of said electrical contact elements.

2. An electrical connector as set forth in claim 1 wherein:

said electrical contact elements extend through selected apertures in said grounding plate.

3. An electrical connector as set forth in claim 2 including:

an electrical filter assembly surrounding at least one of said contacts and being in electrical contact with said grounding plate.

4. An electrical conductor as set forth in claim 1 wherein:

at least one of said electrical contact elements includes separate and spaced pin and socket ends;

an insulator in said shell separating said pin and socket ends; and said electrical connecting means connecting in series said pin and socket ends to the central conductor of one of said components.

5. An electrical conductor as set forth in claim 1 wherein:

said electrical connecting means comprises a printed circuit board slidably mounted within said shell; and an insulator in said shell separating said grounding plate from said board.

6. An electrical connector as set forth in claim 5 wherein:

said printed circuit board embodies a plurality of contact openings aligned with the central conductors of said components;

said insulator being formed with passages therethrough aligned with said contact openings; and said central conductors extending through said passages into said contact openings.

7. An electrical connector as set forth in claim 1 wherein:

said components are frictionally mounted in said grounding plate.

8. An electrical connector as set forth in claim 1 wherein:

said grounding plate comprises a metal disc formed with a plurality of peripheral spring fingers frictionally and electrically engaging the inner surface of said shell.

9. An electrical connector as set forth in claim 1 wherein:

said contact elements are arranged in a circular array coaxial with the longitudinal axis of said shell; and said electrical components are arranged in a generally circular path surrounding said circular array of contact elements.

10. In an electrical connector having a shell containing a grounding plate and an electrical contact element passing through said plate, the improvement which comprises:

an electrical component other than an electrical contact element mounted in said plate;

said component including a first conductor and a second conductor, said first conductor being in electrical contact with said plate; and means other than said plate located within said shell electrically connecting said second conductor to said electrical contact element.

11. An electrical connector as set forth in claim 10 wherein:

said electrical connecting means comprises a printed circuit board removably mounted in said shell.

12. An electrical connector as set forth in claim 10 wherein:

said electrical component comprises an electromagnetic pulse absorber.

13. An electrical connector as set forth in claim 12 including:

a filter element surrounding said contact element and being electrically connected to said plate.

14. An electrical connector comprising:

an electrical connector shell;

front and rear insulator plates positioned in said shell;

a relatively flat, thin grounding plane sandwiched between said insulator plates, said plane embodying peripheral fingers frictionally engaging the inner surface of said shell;

a plurality of electrical contact elements having opposite ends extending beyond opposite sides of said insulator plates;

said grounding plane being formed with a plurality of apertures therein bordered by integral tangs;

a plurality of electrical components other than electrical contact elements frictionally positioned in said apertures, said components each including a central conductor and outer conductive surface, said central conductor extending through said rear insulator plate; and a printed circuit board coplanar with and adjacent to said rear insulator plate, said board embodying conductive strips electrically connecting selected contact elements and inner conductors of said components.

* * * * *